US008833510B2

United States Patent
Koh et al.

(10) Patent No.: US 8,833,510 B2
(45) Date of Patent: Sep. 16, 2014

(54) PHONONIC METAMATERIALS FOR VIBRATION ISOLATION AND FOCUSING OF ELASTIC WAVES

(75) Inventors: Cheong Yang Koh, Jurong West (SG); Daniel Alcazar Jorba, Cambridge, MA (US); Edwin Lorimer Thomas, Houston, TX (US)

(73) Assignee: Massachusetts Institute of Technology, Cambridge, MA (US)

( * ) Notice: Subject to any disclaimer, the term of this patent is extended or adjusted under 35 U.S.C. 154(b) by 42 days.

(21) Appl. No.: 13/463,234

(22) Filed: May 3, 2012

(65) Prior Publication Data

US 2013/0025961 A1    Jan. 31, 2013

Related U.S. Application Data

(60) Provisional application No. 61/482,722, filed on May 5, 2011.

(51) Int. Cl.
| | |
|---|---|
| *F16F 15/04* | (2006.01) |
| *F16F 15/02* | (2006.01) |
| *G10K 11/04* | (2006.01) |
| *G10K 11/30* | (2006.01) |
| *G10K 11/162* | (2006.01) |
| *F16F 15/00* | (2006.01) |

(52) U.S. Cl.
CPC ............ *G10K 11/162* (2013.01); *F16F 15/02* (2013.01); *G10K 11/04* (2013.01); *G10K 11/30* (2013.01)
USPC .......................................... 181/207; 181/209

(58) Field of Classification Search
USPC .......... 181/207, 209, 208, 288, 294, 175, 176
See application file for complete search history.

(56) References Cited

U.S. PATENT DOCUMENTS

| | | | |
|---|---|---|---|
| 6,433,931 B1 * | 8/2002 | Fink et al. ................ 359/586 |
| 6,671,097 B2 * | 12/2003 | Fink et al. ................ 359/586 |
| 7,072,098 B2 * | 7/2006 | Solli ........................ 359/321 |
| 7,292,740 B1 | 11/2007 | Barker et al. |
| 7,474,823 B2 * | 1/2009 | Wang et al. ............... 385/37 |
| 7,733,198 B1 | 6/2010 | Olsson et al. |
| 7,919,216 B2 * | 4/2011 | Lin et al. ................. 430/5 |
| 8,054,145 B2 | 11/2011 | Mohammadi et al. |
| 8,094,023 B1 | 1/2012 | El-Kady et al. |

(Continued)

OTHER PUBLICATIONS

Mahmoud I Hussein et al: "Tailoring of two-dimensional band-gap materials for broadband frequency isolation", ASME 2007 IDETC/CIE 2007, pp. 1-10; Sep. 4, 2007, Las Vegas, Nevada, USA.

(Continued)

*Primary Examiner* — Edgardo San Martin
(74) *Attorney, Agent, or Firm* — Sam Pasternack; MIT Technology Licensing Office

(57) ABSTRACT

A methodology for designing structured metamaterials that can reflect, absorb and focus the propagation of both scalar acoustic and vector elastic waves is described. Three exemplary representative inventions based on the disclosed invention are described, illustrating i) compact ultra-wide broadband isolation, ii) sub-wavelength gaps and negative index propagation utilizing a single material platform, and iii) a fundamentally new method of producing multiple high frequency spectral gaps. Such metamaterial designs possess a wide range of potential applications, ranging from but not limited to, isolating an entity from external mechanical or acoustical vibrations, compact focusing lenses as well as cascaded high frequency filters for wave shaping and nonlinear wave propagation control.

7 Claims, 15 Drawing Sheets

(56) References Cited

U.S. PATENT DOCUMENTS

| | | | |
|---|---|---|---|
| 8,132,643 B2 | 3/2012 | Berker et al. | |
| 8,596,410 B2* | 12/2013 | Deymier et al. | 181/176 |
| 2005/0191774 A1* | 9/2005 | Li et al. | 438/22 |
| 2006/0066493 A1* | 3/2006 | Wang | 343/754 |
| 2007/0145046 A1* | 6/2007 | Vatsya | 219/745 |
| 2009/0092803 A1* | 4/2009 | Bita et al. | 428/209 |
| 2010/0009120 A1* | 1/2010 | Boyce et al. | 428/134 |
| 2012/0000726 A1* | 1/2012 | Deymier et al. | 181/176 |
| 2013/0112496 A1* | 5/2013 | Neogi et al. | 181/175 |
| 2013/0168536 A1* | 7/2013 | Guo et al. | 250/216 |

OTHER PUBLICATIONS

Liu Zhengyou et al: "Locally Resonant Sonic Materials", Science, vol. 289, pp. 1734-1736; Sep. 8, 2000.

Zhang X et al: "Elastic wave band gaps for three-dimensional phononic crystals with two structural units", X.P Physics Letters A, North-Holland Publishing Co., Amsterdam, NL, vol. 313, No. 5-6, pp. 455-460; Jul. 14, 2003.

Osama R. Bilal et al: "Ultrawide phononic band gap for combined in-plane and out-of-plane waves", Physical Review E, vol. 84, No. 6, Dec. 1, 2011.

International Search Report and Written Opinion issued in Connection with International Patent Application No. PCT/US2012/036477 mailed on Apr. 3, 2013.

Zy Liu, et al, "Locally Resonant Sonic Materials", Science, 289, 1734(2000).

Liu ZY, Chan CT, Sheng P, "Three-component elastic wave band-gap material", Phys.Rev. B, 55(16), 165116 (2002).

Ding YQ, Liu ZY, Qiu CY et al, "Metamaterial with simultaneously negative bulk modulus and mass density", Phys. Rev. Lett, 99(9), 093904(2007).

Sheng P. Chan CT, "Classical wave localization and spectral gap materials", Zellschrift fur Krystallographie, 220, 9-10, 757(2005).

Lai Y, Wu Y, Sheng P, Zhang ZQ, "Hybrid Elastic Solids", Nat. Mat. 10, 620 (2011).

Bilal OR, Hussein MI, Ultrawide phononic band gap for combined in-plane and out-of-plane waves, Phys. Rev. E. 84, 055701R(2011).

Economou, E.N.; Zdetsis, A. "Classical wave propagation in periodic structures", Phys. Rev. B 40, 1334 (1989).

Sigalas, M. ; Kushwaha, M.S. ; Economou, E.N. et al., 'Classical vibrational modes in phononic lattices: theory and experiment', Z. Kristallogr. 220, 765 (2005).

Pennec Y, Vasseur JO, Djafari-Rouhani B, Dobrzynski L, Deymier PA, "Two-dimensional phononic crystals: Examples and applications", Surface Science Reports, 65(8), 229(2010) and references therein.

Cracknell, AP, "Tables of the irreducible representations of the 17 Two-Dimensional Space groups and their relevance to quantum mechanical eigenstates for surfaces and thin films", Thin Solid Films,21(107), (1974).

* cited by examiner

PHONONIC METAMATERIALS FOR VIBRATION ISOLATION AND FOCUSING OF ELASTIC WAVES

This application claims priority to provisional application Ser. No. 61/482,722 filed on May 5, 2011, the contents of which are incorporated herein by reference.

This invention was made with government support under Grant No, DMR-0804449, awarded by the National Science Foundation. The government has certain rights in this invention.

BACKGROUND OF THE INVENTION

This invention relates generally to acoustic and mechanical attenuating and focusing materials and devices, and more particularly to metamaterials suitable for mechanical vibration isolation of sensors, as well as acoustic shields from sound that propagate through a fluid, for example air or underwater. This invention relates as well to mesoscale, compact devices for focusing, coupling, localization and controlling the propagation in general of elastic and acoustic waves utilizing sub-wavelength building blocks.

Phononic metamaterials enable the manipulation of both elastic and acoustic waves in different media, from attenuation (including absorption and reflection) to coupling, tunneling, negative refraction and focusing. In particular, the attenuation of vibrations, such as vector mechanical vibrations through a solid, or a scalar acoustic vibration in a fluid, such as in air or water, is important technologically for applications where the presence of such vibrations affects the intended performance of the device or entity in question, such as, but not limited to, a sensor or a source of emission, such as a laser which may suffer from reduction in performance due to losses arising from the coupling of mechanical modes into an acoustic or an elastic medium. Another example of this is the attenuation of high frequency (>2 KHz) sound in acoustic hearing.

Conventional attenuating materials utilize thermally-coupled dissipation mechanisms to reduce the intensity of incident vibrations through dissipation-induced heating of the material. Such a dissipative mechanism does not have frequency selectivity; the attenuation performance is dependent monolithically on the thickness of the material being utilized, governed by the mass-density law, given by $$T = \frac{4\gamma \exp(ik_2 d)}{(1+\gamma)^2 - (1-\gamma)^2 \exp(2ik_2 d)},$$

where T is the amplitude transmission coefficient, d is the sample thickness, and $\gamma$ is the impedance ratio between the different media on both sides of the interface (one medium typically being air). In general, at low frequencies, $$T \cong \frac{i2\sqrt{\rho 1 K1}}{\omega \rho 2 d},$$

hence the lower the frequency, the heavier the mass density needed to achieve the same amount of transmission (attenuation) or the thicker the material required. These materials hence suffer from inadequate low frequency attenuation and implementation issues. As there are characteristic frequency and intensity ranges that have been identified as being detrimental to performance of, as well as to cause mechanical damage to, the device, it is hence desirable to provide an isolating/attenuating material that can be designed to have high attenuation within a target frequency range for broadband vibration and acoustic isolation. Also for certain applications, it is highly desirable to have excellent transmission of certain frequency bands (e.g. receipt of signals) and the ability to design the transmission spectrum across a wide range of frequencies is highly advantageous.

A relevant area of application would be to reduce particular vibrations of a set of frequencies from a body or entity or device that needs to be mechanically attached to a platform, hence providing a tradeoff between the requirement for mechanical stability and vibration isolation.

An object of the invention is a structured metamaterial that possesses multiple high-frequency spectral gaps capable of providing acoustic and/or mechanical vibration attenuation at high frequency ranges while retaining mechanical stability with a larger structure and permitting excellent transmission in selected regions.

Another object of the invention relates to acoustic and elastic metamaterials designated as sub-wavelength, meaning that they are able to control waves with wavelengths much greater than the physical structure, such as the unit cell dimension. These metamaterials are also capable of exhibiting double negative index behavior, leading to a general wave phenomenon known as negative refraction. These devices however, typically require the incorporation of multiple materials (usually greater than 2), to obtain the required double negative index behavior. This presents inherent issues related to scaling down the intended device application to smaller scales, due to fabrication challenges involved in incorporating multiple materials. Some of the issues include the requirement of introducing and fabricating the different material components and adhering the different material interfaces together, which due to their different mechanical properties, limits the choice of material components. This presents challenges in applications involving functioning under dynamic variation in the material mechanical properties, such as thermal fluctuations, thermal cycling and thermal stress arising from differences in thermal expansion coefficients. One further complication of requiring multiple material components include the immediate reduction of throughput due to the fabrication requirements, as well as more complexity in manufacturing, leading to greatly reduced yields.

This invention describes a structured metamaterial that may be fabricated out of a single material that possesses such sub-wavelength negative index behavior, hence addressing several of the above challenges.

SUMMARY OF THE INVENTION

A methodology for designing structured metamaterials that reflect, absorb and mold the propagation of both scalar acoustic and vector elastic waves is described. The methodology outlines the building block components formulating the unit cell of the eventual metamaterial array in terms of the function each building block component imparts on the propagation behavior of the metamaterial, through the final band structure dispersion relation. This systematic approach enables a rational approach towards the design of the unit cell of the metamaterial for a specific target application. In order to demonstrate the generality of this approach, three exemplary representative aspects based on the disclosed invention are described, illustrating compact ultrawide broadband isolation, subwavelength negative index propagation utilizing a single material platform, and a fundamentally new method of producing multiple high frequency spectral gaps. Such metamaterials offer a wide range of potential applications ranging from, but not limited to, isolating an entity from external mechanical or acoustical vibrations, compact focusing lenses as well as cascaded high frequency filters for wave shaping and nonlinear wave propagation control.

Methods and guiding principles are disclosed herein to design phononic metamaterials to yield a plurality of structures offering a range of control of elastic and acoustic wave propagation in materials; some of these exemplary embodiments include negative refraction, ultra-wide spectral gaps as well as multiple-high frequency spectral gaps.

One particular embodiment of the invention is a metamaterial possessing an ultra-wide spectral gap size, $\Delta\omega/\omega_0$, of 102%. The gap size is hence defined as the ratio between the size of the spectral gap and the central frequency of the gap, where $\Delta\omega=\omega_h-\omega_l$, the difference between the upper and lower bounds of the spectral gap, $\omega_0=(\omega_h+\omega_l)/2$. Such an embodiment may be utilized for applications including, but not limited to, a band-stop filter for acoustic or elastic vibrations, or as vibration isolation platform fixtures for certain entities, such as sensors, or emission sources such as microlasers which require vibration isolation from certain frequencies, or range of frequencies, of vibrations and noise that would impair the performance of the entity or device.

Another embodiment of this invention is a novel metamaterial structure that includes multiple high-frequency spectral gaps. The formation of these spectral gaps is unique from those that are in the current art and are directly developed from the disclosed invention. Such a metamaterial may be utilized in applications including, but not limited to, multiple frequency sensors and mechanical shields from high intensity vibrations, which typically are nonlinear and hence possess multiple high frequency components in their spectral content. One other possible application would be in the formation of a guiding structure that must be mechanically stable and needs to shield an entity from higher frequency vibrations.

Yet another embodiment is a method of designing metamaterials with sub-wavelength spectral gaps, utilizing only a single material. This is a significant advancement over the current art, in which the presence of a sub-wavelength spectral gap typically requires two or more solid building block components. Our embodiment enables design of phononic metamaterials which can be scaled down to much smaller dimensions, such as the micron and sub-micron scale applications such as compact phononic lenses for focusing high frequency elastic and acoustic waves at these smaller scale regimes, compatible with existing fabrication techniques, such as optical lithography, or other top-down techniques. In contrast, current methods of fabricating such sub-wavelength devices require multiple steps, are highly dependent on specific material component choices and are not inherently scalable in fabrication length scales, strongly limiting their applicability.

DETAILED DESCRIPTION OF THE PREFERRED EMBODIMENTS

At the outset, it should be understood that the figures and the descriptions of the present invention have been simplified to illustrate elements that are relevant for a clear understanding, while eliminating, for the purpose of clarity, many other elements found in typical attenuating fixtures and focusing devices, and methods of making and using them. Those of ordinary skill in the art may recognize that other elements and/or steps may be desirable in implementing the present invention. However, because such elements and steps are well-known in the art and because they do not facilitate a better understanding of the present invention, a discussion of these elements and steps are not provided herein.

Attenuating materials are generally known and used as a filter of either mechanical vibrations or acoustic sound, propagating in air or underwater, in order to reduce the amount of final intensity of either a single or multiple range of frequencies from reaching a final device or entity. This entity may be an inanimate object, such as a sensor or electronic device, or an entity that is either a transmitter or receiver of information. The entity may also be an animate object, such as a human being. One such example is an application of this attenuating material for protection from high intensity, high frequency noise that impinges onto the ear of a person while maintaining excellent transmission characteristics in key frequency regimes.

This invention is a methodology for designing structured metamaterial that is capable of producing a multiplicity of wave propagation behavior, such as ultra-broadband vibration attenuation, with a compact form factor, meaning it requires fewer repeat layers in order to present the same degree of attenuation as compared with traditional damping materials, presenting both a frequency range specific broadband attenuation within a compact form factor.

Phononic metamaterials are generally known to possess band gaps, which arise due to a correct choice of structure, unit cell and selected features. A phononic metamaterial according to one embodiment of the present invention allows for a broadband attenuation response over a wide frequency range, with a frequency range of operation which can be tailored depending on the choice of structure. Yet another embodiment allows for a multi-spectral attenuation response over an ultra-wide frequency range, utilizing the same material.

Figure 1:
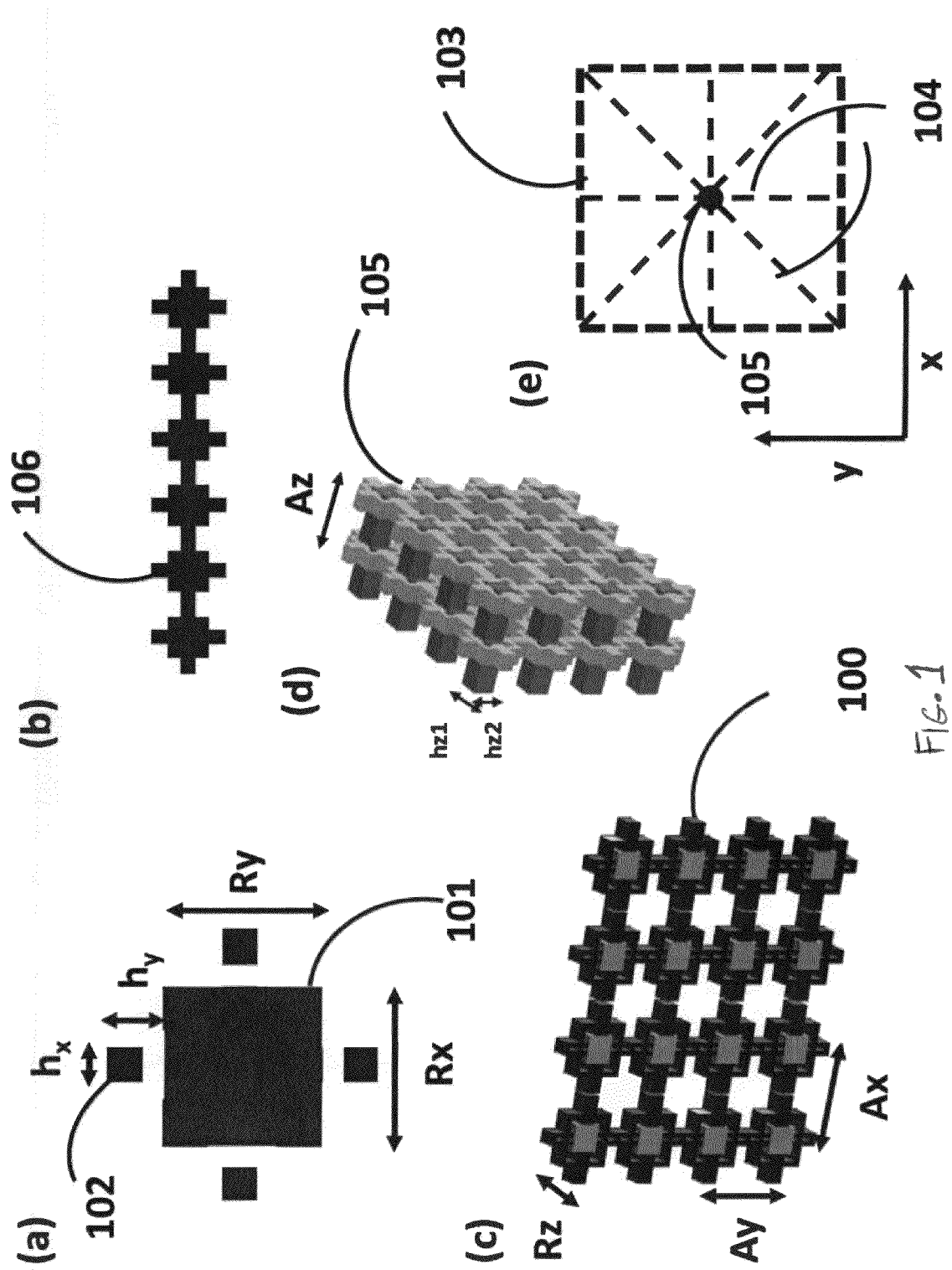
FIGS. 1a, b, c, d and e are schematic illustrations of exemplary embodiment of a unit cell (1a), one dimensional (1b), two dimensional (1c) and three dimensional (1d) arrays of the unit cell in various dimensions of phononic metamaterial, presenting the symmetry elements within the unit cell and the specific Wyckoff position being occupied (1e).

A metamaterial usually consists of a regular array of individual units, which are referred to hereafter as unit cells. The array may be attached, connected or appended to other structures to facilitate its particular function. FIG. 1(*c*) shows exemplary representations of a planar array 100, with two-dimensional periodicity, with unit cell lengths Ax, Ay, and an associated thickness Rz. Alternatively, it is also possible to stack these planar arrays 100 into a three-dimensional array 105, FIG. 1(*d*), whereby the spacing between the planar arrays is Az. It is also possible to design a three-dimensional embodiment of the metamaterial which does not involve linear stacking of individual planar arrays 100. Yet another possible embodiment includes a one dimensional array 106 as shown in FIG. 1(*b*). All of these are possible embodiments of the invention giving rise to the metamaterial structure. It is conceivable for the metamaterial array to be appended, truncated, or bound by structures, surfaces or interfaces which are different from the unit cell making up the array, for example as shown in FIGS. 5, 6, 7 and 15. The choice of truncation and hence the formation of the boundary may also involve the inclusion of a structure that serves as the truncation layer. The specific design of this truncation layer will depend on the specific application which the metamaterial has been designed for. While prior art has demonstrated phononic metamaterial. [1-4] and crystal [5-7] designs capable of spectral gaps, allowing for broadband transmission attenuation in a range of frequencies, there is a requirement for phononic metamaterial designs with ever larger spectral gaps, as well as a more compact form factor. From the fundamental perspective, there is a lack of a proper design methodology to guide the design of a particular metamaterial structure with a desired set of wave propagation behavior. The approach from prior art [1-9], typically includes the choice of multiple material components, of which one, or more, may be air, or fluid, as the component building blocks. This is particularly evident in the prior art [1-6] approach in developing metamaterials with sub-wavelength propagation behavior, where typically three or more material components need to be utilized [1-5].

Subsequently, by choosing one or more of these material components as the building block and the other component(s) to fill the complimentary phase of a designated unit cell, a space/plane group for the structure is chosen and the volume fraction of one phase is varied, for choices of different sets of material components to search for an overall structure with the desired properties. In this approach, the specific band dispersion depends on the complicated mixture of structural details of the system and material choices. Indeed, there is a prevailing opinion that there are no a priori guiding principles for selection of the material set and unit cell design to control the final band dispersion. This invention discloses a design methodology offering a systematic design procedure for phononic metamaterial structures, utilizing general principles of group theory [11-13]. The design methodology unifies the different design parameters of fill fraction, space/plane group and material component choices by systematically classifying these design parameters for the unit cell structure into the context of the choice, positioning of the building blocks and the type of mechanical topology within the unit cell.

FIG. 1 may be utilized as an exemplary outline of the design methodology. FIG. 1*a* shows an exemplary schematic decomposing the building blocks making up the unit cell. The components of the building blocks 101, with linear dimensions Rx, Ry and the mechanical connections 102, with dimensions $h_x$, $h_y$ can be selected and varied in a way predicated by the invention to achieve deterministic properties which are desired by the targeted application. As shown in FIG. 1(*a*), a single unit cell consists of building blocks 101, here depicted as squares, but it should be understood that other shapes are possible, depending on the particular application being desired, and its mechanical connections 102. In this example, the dimensions of 101, are determined by Rx and Ry; it should however be understood that other shapes and geometries are possible and may be necessary to achieve other properties. The particular choice of the shape is related to the eventual performance of the material and important to the design methodology presented in this patent application. The geometry and material type of building block 101 determines the frequency, or set of frequencies where a desired propagation response, such as a spectral gap, or a particular propagation behavior, such as negative refraction. The orientation and placement of 101 in a particular Wyckoff site, given in FIG. 1 as 105, is chosen together with the mechanical connections 102 to form the final unit cell design. The orientation of 101 is defined as the physical placement of 101 with respect to the symmetry elements 104, which are here mirror lines, present within the chosen unit cell. In general, for example but not restricted to, the building block 101 possesses self-symmetries, which are point symmetries of the building block itself. Depending on the particular application desired, the building block 101 is oriented in such a way to either align, or misalign, its self-symmetries with those in the unit cell 104. As the chosen building block always ultimately possess point symmetries that are strictly lower than that of the maximal point symmetry of the final lattice net 103 chosen for the array, the choice of the particular building block geometry will reflect this fact. The lattice net will be defined here to consist of the unit cell outline, the symmetry elements utilized in the design and the Wyckoff position occupied in the particular embodiments being discussed. To elaborate, in this particular example, 101 possess a 4 mm point symmetry, which happens to be identical to the maximal point symmetry of the lattice net chosen 103, also 4 mm, as indicated by the two pairs of the mirror planes 104 in FIG. 1(e). The lattice net indicates the plane/space group of the chosen structure, and indicates the symmetry elements 104, as well as the Wyckoff sites 105 being occupied by the building blocks to form the individual lattice. In FIG. 1, 101 is oriented such that it is aligned with the symmetry elements 104, to form the final unit cell design.

The invention utilizes the geometry of the building block, the choice of the plane/space group, in particular the Wyckoff sites 105 to place the building blocks on, and finally on the orientations of the mechanical connections, to deterministically design a particular dispersion relation. As mentioned, the building blocks are chosen in order to achieve a particular set of free resonances, it should be clear to one ordinarily skilled in the art that each building block possesses multiple free resonance frequency modes, corresponding to resonant vibration eigenmodes of different symmetries, such as, but not restricted to, the monopolar, dipolar and higher order modes. The arrangement of the resonance frequencies in terms of the frequency levels needs to be selected correctly in order to achieve a target final dispersion relation. The permissible Wyckoff positions of the building blocks need to also be chosen together with the particular geometry and mechanical topology in order to achieve the desired dispersion relation. The mechanical connections necessarily need to be chosen to evolve the final band dispersion, while conforming to the chosen lattice net 103. As should be clear to those ordinarily skilled in the art, the size, geometry and shape of the mechanical connections may be varied together with various combinations and orientations, positioning of the building blocks to design various phononic metamaterial structures with certain required properties for applications, besides the three exemplary embodiments disclosed in this application.

The building blocks may be arranged relative to each other, in a plurality of ways within the unit cell. A single unit cell may consist of a single, or multiple building blocks, of identical or different geometries/shapes. The placement of the building blocks within the unit cell naturally conforms to certain symmetry elements, such as a mirror plane (labeled with dashed lines) or a glide plane (labeled with dash-dotted lines) and these all have a strong influence on the final propagation behavior of elastic and acoustic waves within the final metamaterial array. These various positions are known to those ordinarily skilled in the art as the Wyckoff positions, of which a comprehensively tabled database is readily available [10, 11]. The choice of the building block position, known here as the Wyckoff site, on the resultant regular array is matched to the correct orientation of the mechanical connections to the building blocks, referred to herein as the mechanical topology, in order to obtain a desired final wave propagation response.

Each individual building block is connected to one another through mechanical connections, as shown in FIG. 1, with a one dimensional array 106, a two-dimensional array 100, and a three-dimensional array 105, being illustrative exemplary embodiments. While it is understood that these connections may be made of a different material, in this particular embodiment and for illustrative purposes, they are made with the same material as the building blocks.

A plurality of mechanical connections is possible and can be classified according to the family of orientations, such as <10>, <11> and so on; those of ordinary skill in the art will recognize that these refer to the crystallographic orientations. There may be more than one family of orientations incorporated as mechanical connections, for example a unit cell may utilize both <10> and <11> class of mechanical connections, as in 1201 (FIG. 12(a)). The sizes of the mechanical connections may be varied, in terms of their thickness, widths and length, together with their orientations, and size and positioning of the building blocks to obtain the resultant wave propagation behavior. Example embodiments of this resultant wave propagation are, but not limited to, frequency range of attenuation or isolation, as well as negative refraction.

The variation in the amount of solid material, taken as a ratio over a fully filled space with same lattice basis, is known as the fill fraction, otherwise also known as volume fraction (in three dimensions) or area fraction (in two dimensions) of the metamaterial. All such variations of the amount of solid material for the metamaterial may be divided into the building blocks and its mechanical topology. In other words, by choosing the mechanical topology to match the positioning of the building blocks, the vibration isolation/attenuation range may be maximized, enabling superior attenuation characteristics, of which the embodiment in FIG. 2a is an example, exemplified by the band structure dispersion relation in FIG. 4. The size, given by the lateral width, thickness and the length, of the mechanical connections affect the frequency range of the vibration attenuation, as well as the number of repeat units required to obtain a certain degree of attenuation. Hence the size of the mechanical connections also have to be chosen to match the building block sizes, and hence their mechanical resonances. As a demonstration of the generality of this approach, we describe three different embodiments of the invention to achieve a plurality of applications to exemplify the design methodology disclosed by this invention.

A metamaterial isolator, according to one embodiment of the present invention allows for an ultra-wide flattened vibration frequency isolation response, and hence improved vibration isolation or attenuation. Furthermore, it enables the development of a very compact isolator, reducing the number of repeat units which are typically required to achieve such a wide isolation response.

Figure 2:
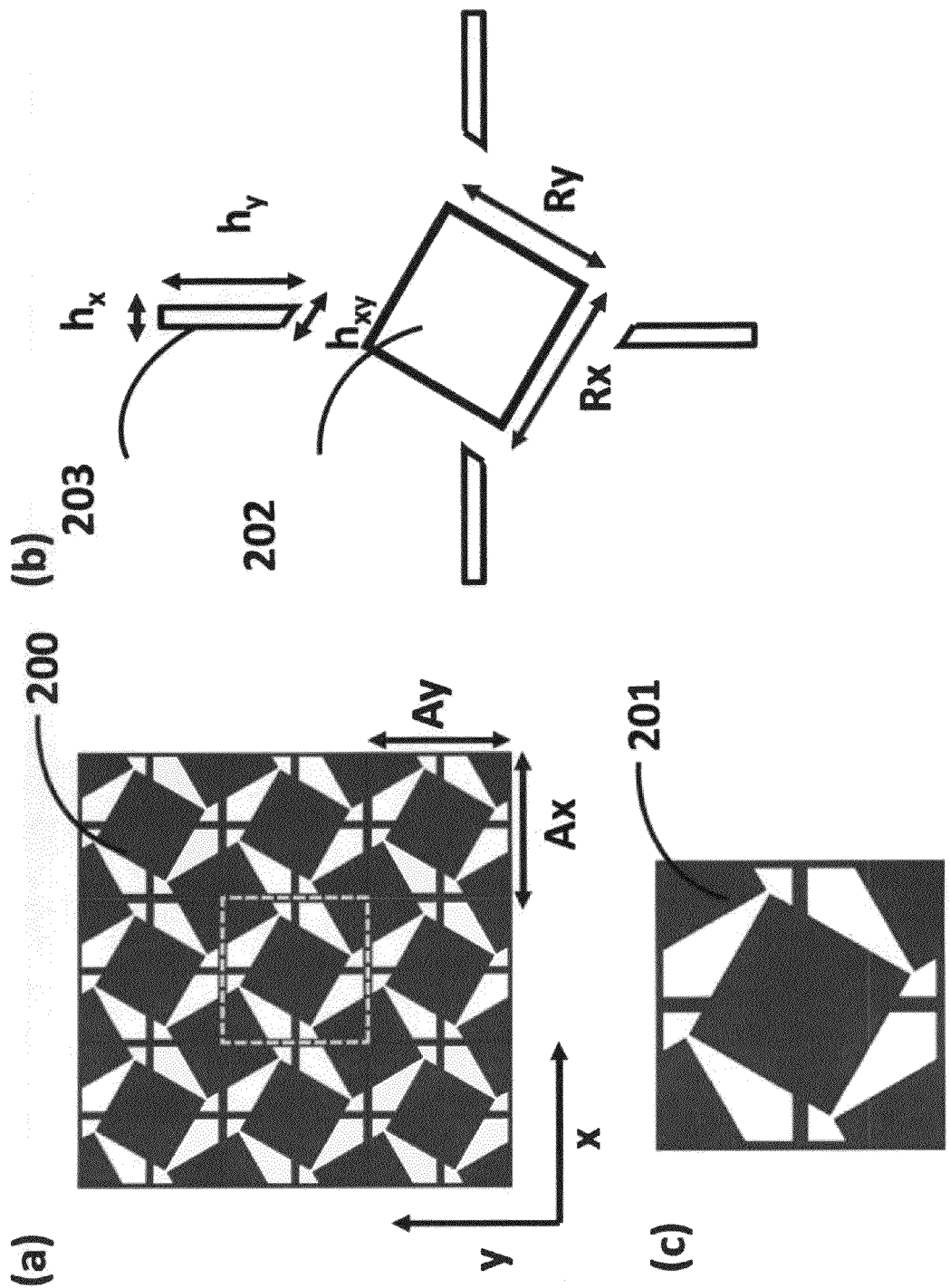
FIGS. 2a, b and c are schematic illustrations of a unit cell structure of an embodiment of the invention that possesses a 102% spectral gap, providing a schematic of the two dimensional array (2a), the components of each individual building blocks of the unit cell (2b) and the schematic of the unit cell (2c).
Figure 4:
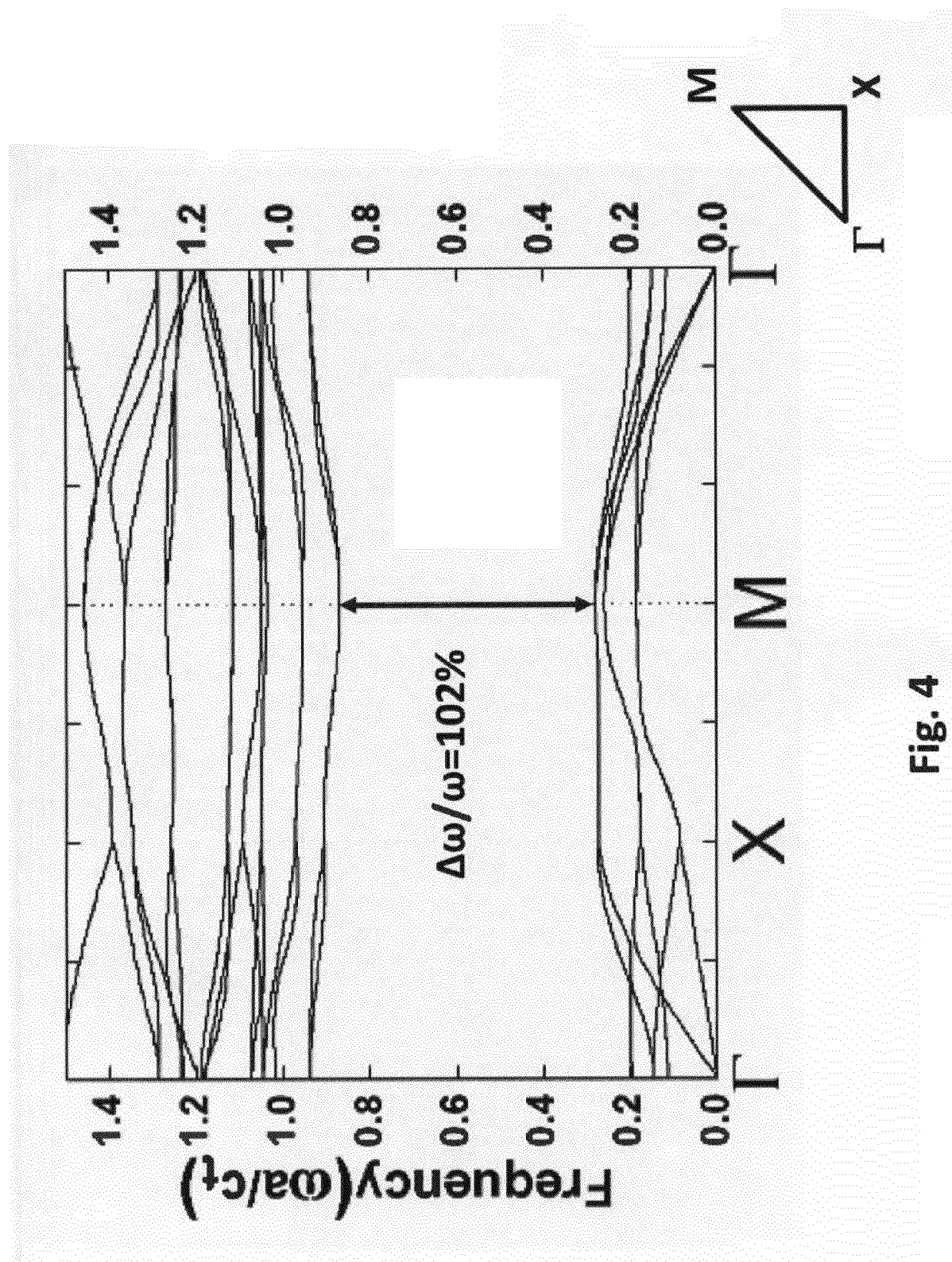
FIG. 4 is a graph showing the band structure dispersion relation of an embodiment of the invention shown in FIGS. 2 and 3.
Figure 5:
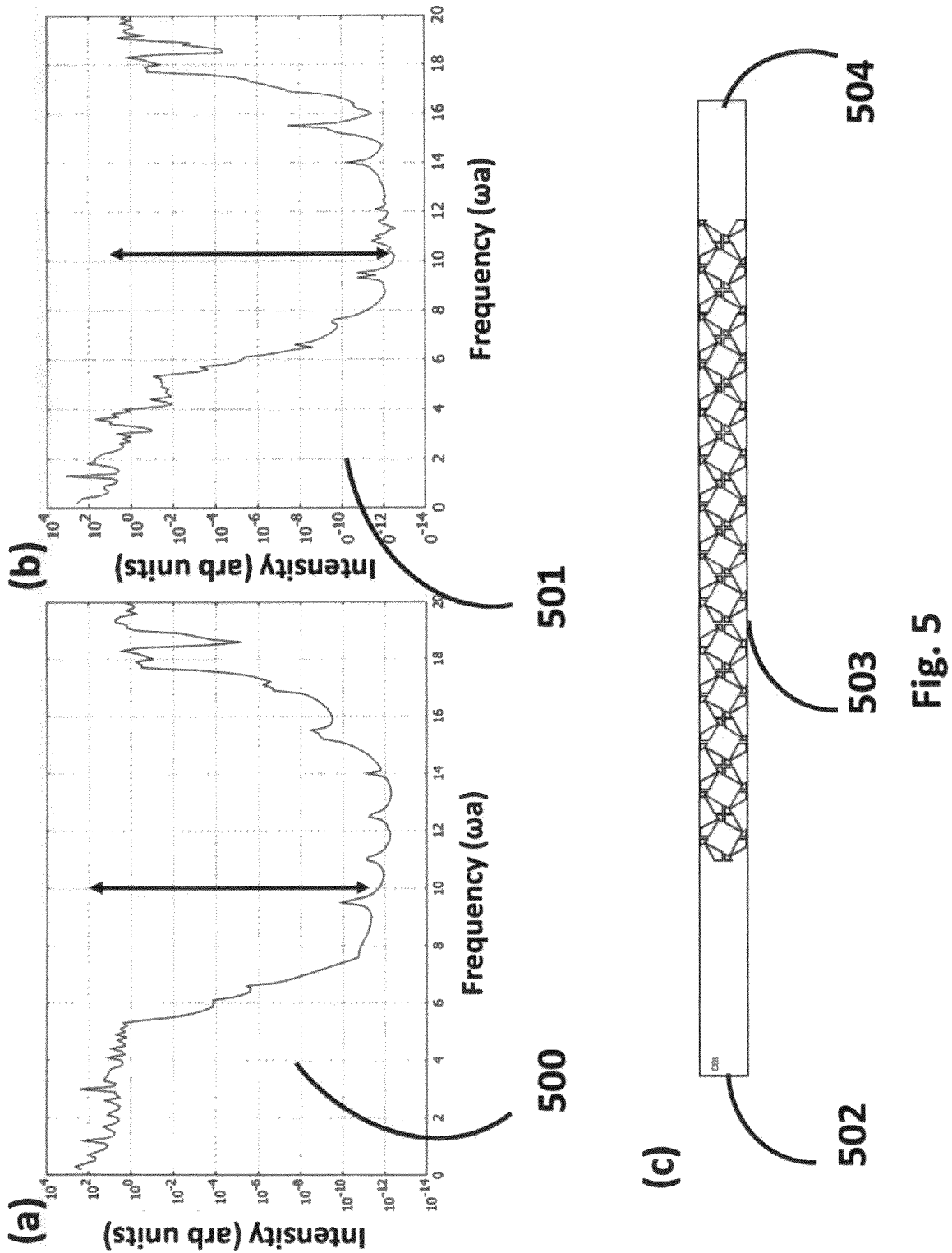
FIG. 5a is a graph of intensity versus frequency of a structure with 10 repeat layers under a longitudinally polarized incident excitation over the normalized frequency range ($\omega$a) of 0 to 20.
FIG. 5b is a graph of intensity versus frequency of a structure with 10 repeat layers under a transversely polarized incident excitation over the normalized frequency range ($\omega$a) of 0 to 20.
FIG. 5c is a schematic illustration of an exemplary embodiment of the invention.
Figure 6:
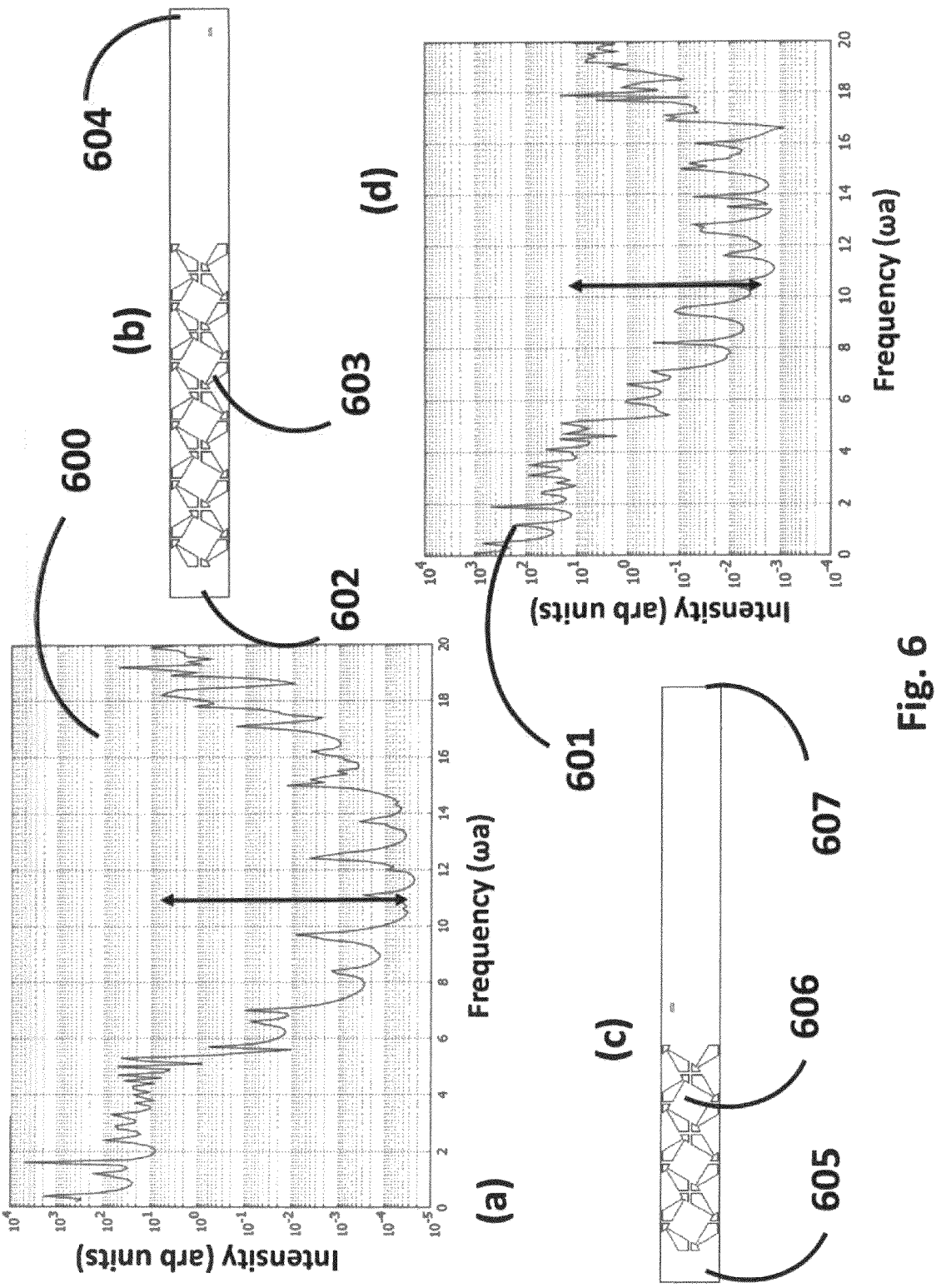
FIG. 6a is a graph of intensity versus frequency of an embodiment of the metamaterial, described in FIG. 6b.
FIG. 6b is a schematic illustration of a metamaterial according to an embodiment of the invention.
FIG. 6c is another schematic illustration of a metamaterial in another embodiment of the invention.
FIG. 6d is a graph of intensity versus frequency for an embodiment of the metamaterial disclosed herein in FIG. 6c.

Referring to FIG. 2, a unit cell 201 (FIG. 2(c)) of an exemplary phononic metamaterial is shown, wherein the solid building blocks 202 are connected by mechanical connections 203 defined here by $h_x$, $h_y$ and $h_{xy}$ to indicate the possible variations in the shapes of the mechanical connections; these mechanical connections further may be made of the same, or a different material. This constitutes the unit cell. A multiplicity of this unit cell is repeated and arranged in a regular array to form the resultant metamaterial 200 (FIG. 2(*a*)). The general final array, in terms of the dimensions and number of repeat unit cells to form the final array depends on the specific implementation; the current embodiment is a simple illustrative example that illustrates the metamaterial sandwiched between two homogeneous slabs, of which the entity to be isolated is on one end of the entire structure, labeled by 701 in FIG. 7. The dispersion relation of an infinite array of 201 is computed in FIG. 4, showing the ultra-wide spectral gap of 102%, computed using silicon as the solid material. Computations were further conducted with a representative class of materials, ranging from metal (aluminum and steel), as well as a typical polymer, such as poly(methylmethacrylate), or poly(dimethylsiloxane) and these structures yield similar spectral gap widths of approximately 100%, with about a 5% variation. This illustrative computation is to highlight that the property of the spectral gap is a general feature based on the invention method, and is robust across different material platform choices. In FIG. 5, transmission spectra were then numerically computed for a metamaterial constructed out of a polymer, with mechanical properties of E=10 GPa, Poisson ratio=0.2152, and mass density of 1300 kgm-3. As shown clearly, both longitudinal and transverse excitations, launched from 502 and collected at 504, after passing through 503, the metamaterial structure, display a 102% spectral gap, with 100 dB suppression of intensity in this range. As an example but not restricted to, for such a spectral gap to occur in the 6 to 18 KHz regime, the structure depicted in 201 will have the following dimensions: unit cell dimensions Ax, Ay will be 100 mm, Rx, Ry will be 56 mm, $h_x$ will be 13.7 mm, $h_y$ will be 16.6 mm and $h_{xy}$ will be 5.7 mm.

In accordance with the invention, for this particular embodiment, we choose a building block 202 (FIG. 2(*b*)), which has a set of resonant frequencies. In order to maximize the size of the spectral gap, the resonant frequency of the building block should be close to the target frequency region of the intended target application. Upon the choice of the arrangement of the final metamaterial array, known as the lattice, the possible position types, labeled by the Wyckoff sites, is now known. Depending on the target dispersion relation, the correct Wyckoff position has to be chosen. In this particular embodiment, lower multiplicity Wyckoff sites 300 (FIG. 3(*a*)) should be chosen for the occupation by the building blocks in order to ensure that the interaction is predominantly due to the periodicity, which will enhance the interaction and lead to a larger spectral gap. In this embodiment, therefore, the mechanical connections forming the mechanical topology should avoid directions which would mechanically link the building blocks 202 along the mirror lines 301. Referring to 304, this implies avoiding connections which will physically emphasize symmetry elements such as the mirror line, i.e. along the <11> family of directions. For this chosen plane group, or lattice net, the remaining possibility is given by the <10> family of connections, which is the correct mechanical topology of the network connections 303 to be chosen. The specific size and dimensions of the mechanical connections may be tuned to optimize the desired/required spectral gap width, etc. It is contemplated that instead of utilizing the same material throughout the array, building blocks made out of different materials, having different geometric shapes and of similar mechanical but different optical and electrical properties may also be utilized. This would be attractive in optimizing a particular intended function of the device, which may include coupling of mechanical with other properties such as but not limited to, optical or electrical properties. This same rule applies to the mechanical connections 303. The only requirement is that the totality of the choice and the arrangements still follow the requirement of the building block types and positioning in the lattice array, taken with the correct interpretation of the correct lattice type. It is also contemplated that building blocks consisting of materials with different linear and/or nonlinear mechanical properties might be utilized, depending on the particular application. This pertains to the possibility of choosing a lattice net with a multiplicity of Wyckoff sites and desiring different behavior in the linear, meaning here the linearly elastic regime, and the nonlinear range, meaning here the non-linear regime, which may occur at large strains, during onset of plasticity and/or specific frequencies of the impinging vibration at high intensities of acoustic or mechanical energy flux This is further attractive in applications where the metamaterials are designed to focus, localize or deflect acoustic energy in certain directions or locations; hence metamaterial structures may be designed with the incorporation of materials with different mechanical behavior, including viscoelasticity, mechanical damping or thermo-mechanical damping behavior, for optimized absorption of mechanical or acoustic energy, for an exemplary embodiment. The intrinsic properties of possible materials components are rich and diverse, in terms of their linear and nonlinear mechanical behavior, such as but not limited to, elastic, elasto-plastic, visco-elastic; in many cases the particular properties would depend on the intrinsic molecular or atomic structure of the constituent materials. Certain fluids and gels may possess particular properties such as but not limited to, non-Newtonian flow properties such as in dilatant materials, or gels that may undergo phase transitions with a controllable tuning parameter that are attractive to the optimized function of a particular application of the metamaterial. It is contemplated that the combinations of material components with different mechanical behavior, in different spatial, frequency or timescales may be utilized in the design of the particular metamaterial or device design, depending on the intended application and the desired performance to be optimized. It is further contemplated that the design of the metamaterial structure may consist of liquid objects, combinations of different liquid objects, or materials that may undergo a phase transition, such as a solid-liquid phase transition, during the intended device operation, which may involve the variation of certain operating conditions that lead to the phase transition.

Such a configuration is particularly suited for vibration isolation or attenuation in a lateral fashion. Yet another embodiment includes the building block, connected by mechanical connections in all three dimensions, as shown in FIG. 1(*a*). In this embodiment, the unit cell is then repeated and arranged in a three-dimensional regular array to form the resultant metamaterial. Such a configuration is particularly suited for attenuation for an isolated entity, such as a sensor, or a biological organ, such as the ear.

Figure 3:
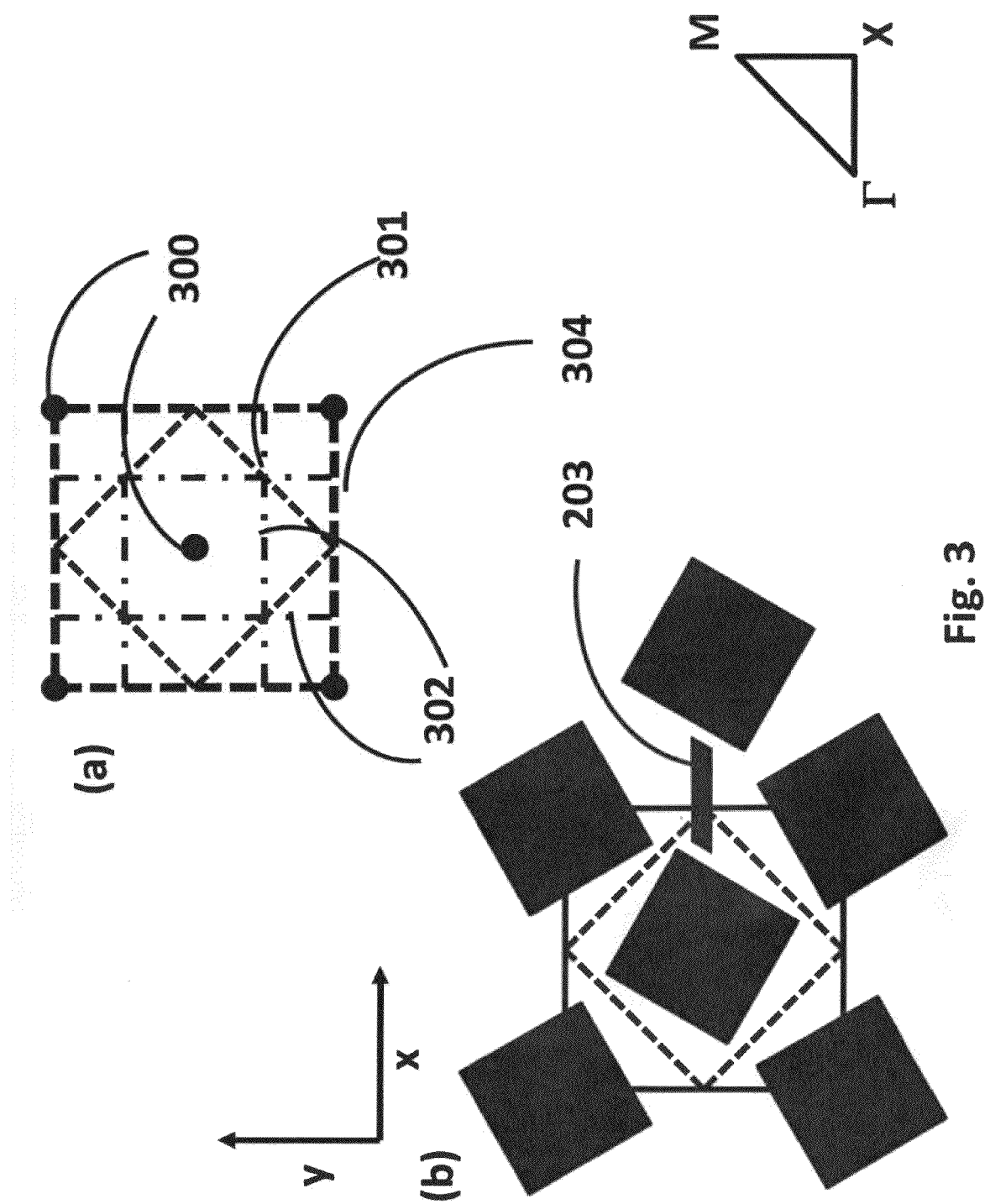
FIGS. 3a and b are schematic illustrations of representative building block components constituting the unit cell of an embodiment of the invention, demonstrating the utilization of the lattice net (3a) and the subsequent positioning of the building blocks in various Wyckoff sites within the unit cell (3b).

FIG. 3 illustrates an exploded view of an exemplary embodiment of the present invention. The building block 202 (FIG. 2(*b*)) is first chosen to have a desired frequency of response; that is the frequency of operation, whether the operation is for attenuation or vibration. This sets the choice of the building block. The building block is chosen with a particular position 300, with respect to the intended final formation of the regular array utilized. For this particular embodiment, the position of the building blocks, prior to the insertion of the mechanical connections, is oriented to fulfill the presence of orthogonal symmetry operations, known as glide planes. The particular choice of mechanical connections in this case is to minimize the physical effects of certain symmetry elements 301. In this particular embodiment, the choice of the building block positions, together with the mechanical connections enhances the frequency range of the vibration attenuation. As shown, the transmission spectrum 600 (FIG. 6(*a*)) of the metamaterial array is quite impressive, for a structure consisting of only 5 layers is 40 dB suppression, for just 3 layers 601 is still a 25 dB suppression. Analogous to the 500, 501 spectra, for 600, longitudinal excitation was launched from 602, and collected at 604 after propagating through 603. For 601, longitudinal excitation was launched from 605, and collected at 607 after propagating through 606. To be clear, 503, 603 and 606 represent a single repeat unit along the lateral direction, with 10 repeated layers forming the actual metamaterial structure. However, someone ordinarily skilled in the art will realize that this number of repeat layers can be varied in order to achieve the required performance.

The presently disclosed structures are much more compact than existing structures, meaning that it requires fewer repeat units to achieve the same degree of vibration isolation. This is clear from the exemplary attenuation figures, where a three unit layer 601 shows a 30 dB suppression of intensity, which is comparable to typical phononic crystal structures requiring ten or more layers [6-9].

Figure 7:
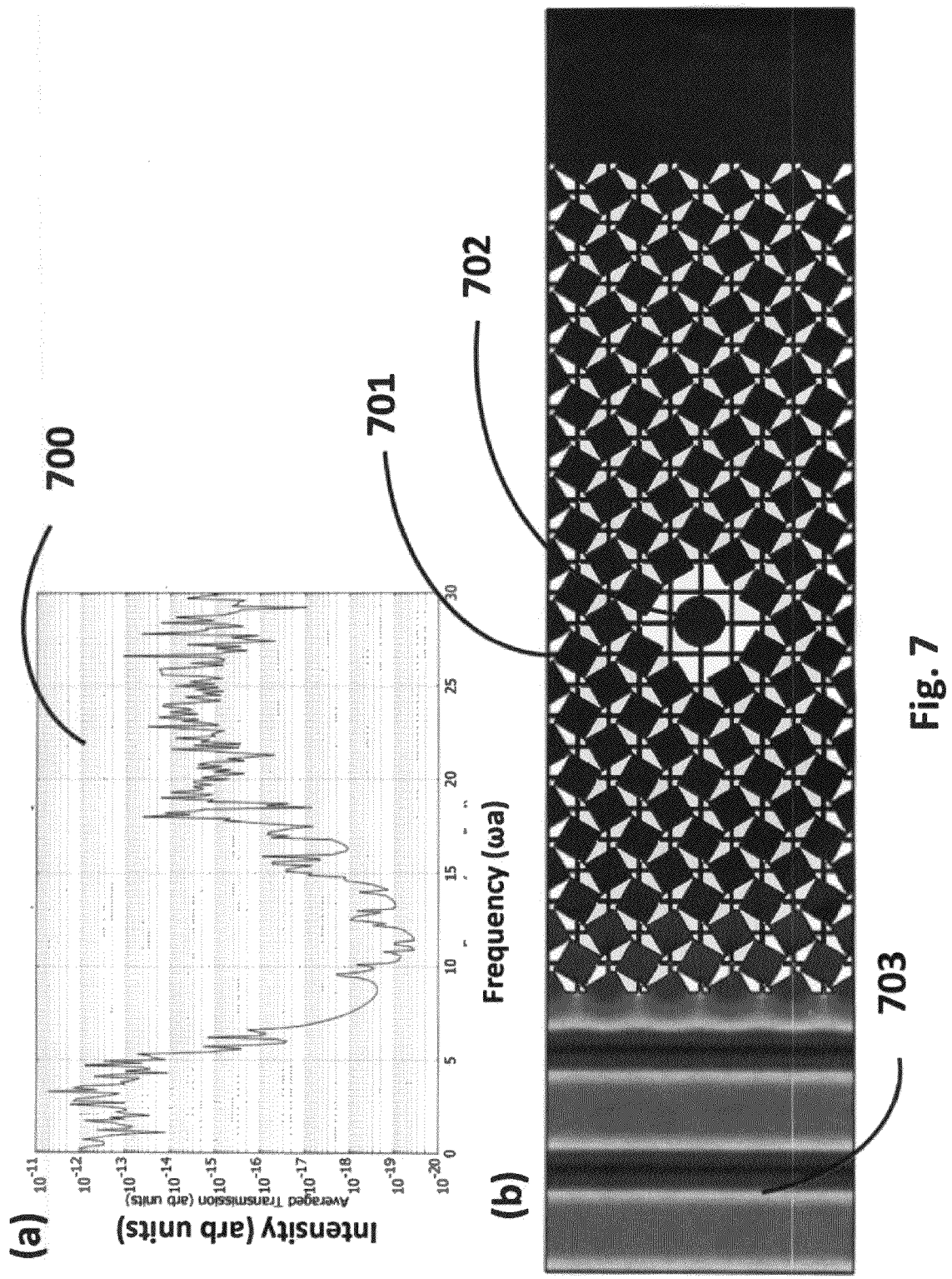
FIG. 7a is a graph of intensity versus frequency for the transmission spectrum of an isolated structure.
FIG. 7b is a micrograph of an implementation of the structure described herein as an isolation fixture.

Referring to FIG. 7, one exemplary embodiment involves the isolated entity 702, surrounded by the metamaterial array 701, which serves as a vibration isolation platform for the entity. An incident source is launched from 703. The computed transmission spectrum 700 (FIG. 7(*a*)) at the entity being isolated is computed and shows a 50 dB reduction. This particular embodiment demonstrates one potential implementation of this metamaterial array as a vibration isolation platform for the central entity, which may be functioning as a sensor, such as a receiver, or as an active element such as an emission source to prevent mechanically induced losses. We note here that the size of the object to be isolated can be varied and is not restrictive, for example, to a single Wyckoff position of the vibration isolation structure.

The present invention allows for a compact vibration isolation solution, meaning that it requires significantly fewer repeat layers to perform the same degree of attenuation (greater than 20 db) as compared to current commonly known phononic crystals [6, 7] or conventional damping materials (1-4). This is a distinctive feature of the invention and allows for a compact vibration isolation material or platform, as shown in FIG. 7.

Yet another embodiment of this invention is a metamaterial array possessing high frequency multiple, meaning in this case two or greater, complete spectral gaps. High frequency is defined here to correspond to frequency regimes which typically fall above the Bragg regime, defined with a normalized frequency, given by $(\omega a/c) \sim 0.5$, where a represents the unit cell dimensions, and c the acoustic velocity of the homogeneous medium being utilized. Possible applications for this include, but are not limited to, shaping multiple harmonic mechanical pulses, breaking up sharp temporal pulses and deflecting nonlinear elastic and acoustic waves.

Figure 8:
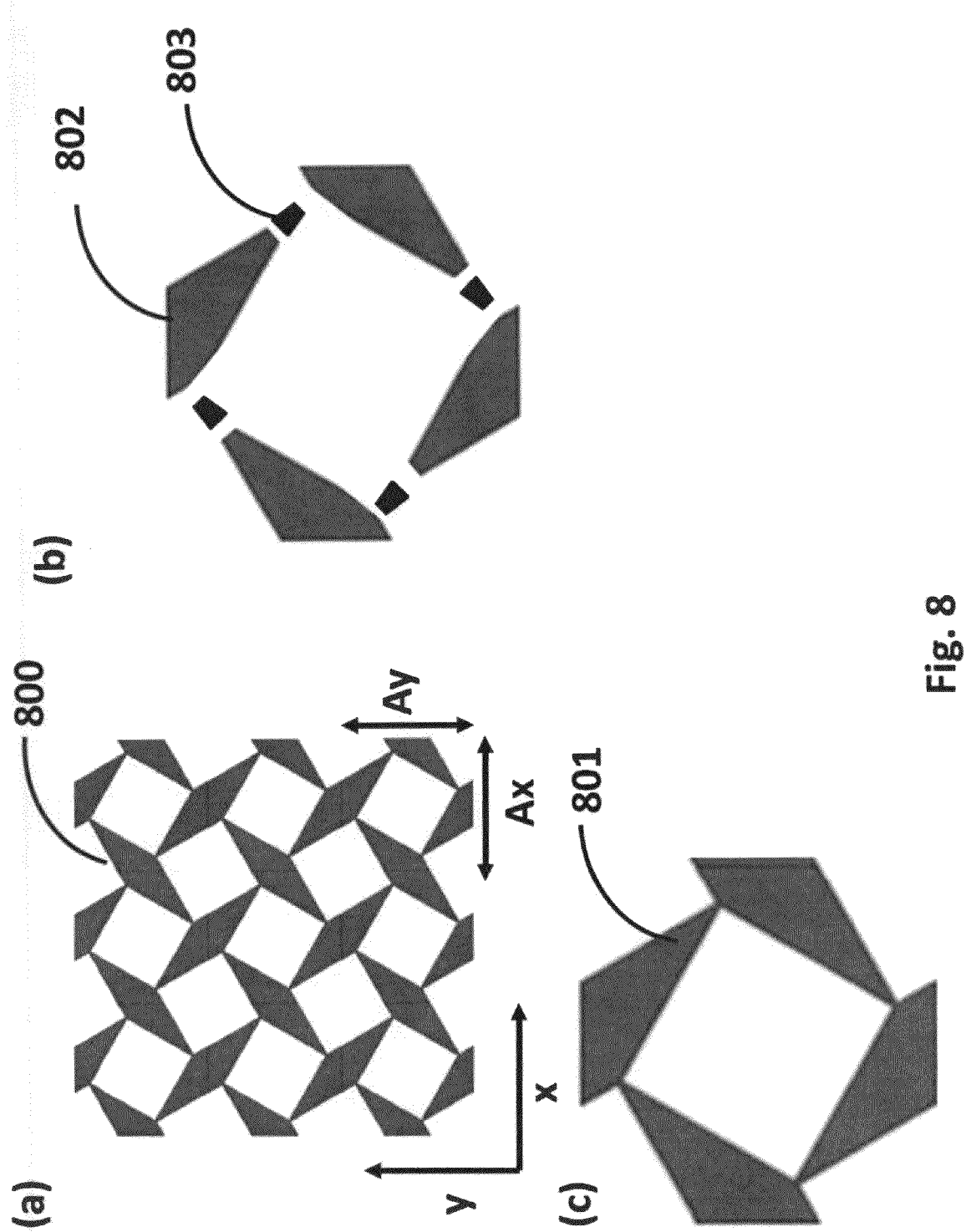
FIGS. 8a, b and c are schematic illustrations of the unit cell structure of an embodiment of the invention disclosed herein, describing the array (8a), the building components of the unit cell (8b) and the unit cell (8c).

This second representative embodiment exemplifies the development of a metamaterial with a novel band dispersion relation, which is capable of providing multiple high frequency spectral gaps while maintaining greater quasi-static/lower frequency mechanical stability due to its larger length scale structure. In comparison with conventional phononic crystals, the frequency range of attenuation, is approximately three times higher, based on the same unit cell size as a conventional photonic crystal which one ordinarily skilled in the art would be familiar with [1-7]. Referring to FIG. 8, the unit cell 801 is depicted together with its array/lattice view 800. This particular embodiment discloses a fundamentally new way of obtaining this particular dispersion relation. 801 consist of the building block components 802 and its mechanical connections 803 forming the topology, and FIG. 9 marks the Wyckoff positions 901 on the lattice net definition 900. In this embodiment, the building blocks need to be chosen to have the lowest possible self-symmetries, while still fulfilling the governing symmetry operations 902 required in the chosen lattice net. Referring to the lattice net and choosing the positions 901, the chosen building blocks are only required to have the symmetry of a mirror plane 902. The particular geometric shape of the building blocks may be varied, while conforming to this requirement or fulfilling any of the other possible point symmetries as a result of the Wyckoff position chosen. In this particular embodiment, the building blocks are chosen on two levels, the first consisting of the single building block labeled 903. The resonant frequencies of this building block should lie in the frequency range of interest. Necessarily, because the structure is designed to work at higher frequencies, the Wyckoff positions being considered typically, but not always, need to have a multiplicity of Wyckoff sites greater than 1 per unit cell; in this particular embodiment here there are 4, as shown in 900. This consideration is general to the invention and can be readily recognized by someone ordinarily skilled in the art.

Figure 9:
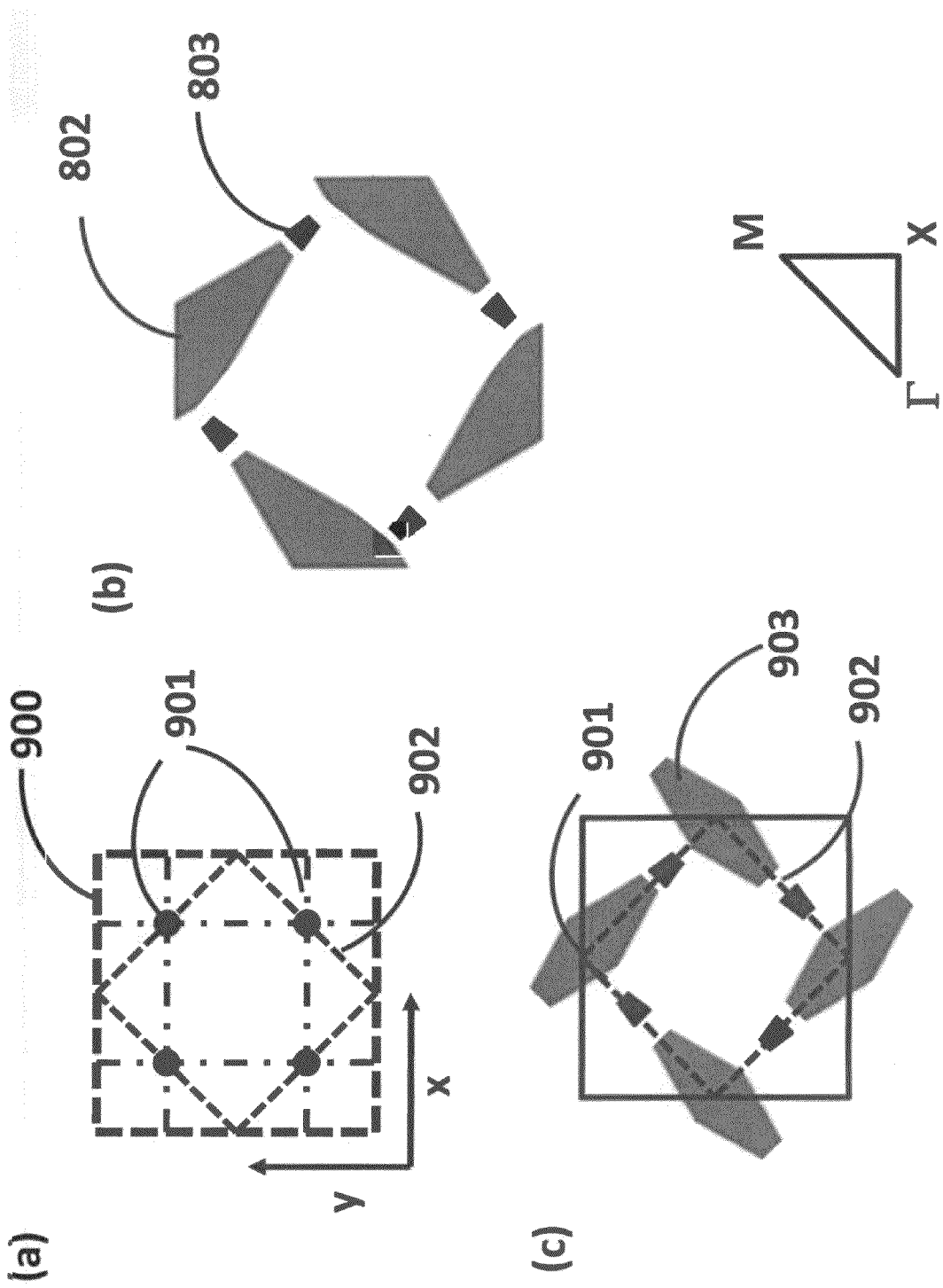
FIGS. 9a, b and c are schematic illustrations of representative building block components constituting the unit cell of a metamaterial designed based on the design methodology disclosed herein, providing the lattice net describing the symmetry elements and the subsequent positioning of the building blocks within the unit cell (9a), the building block components of the unit cell and the placement of the building blocks within the lattice net, conforming to the symmetry elements and Wyckoff positions.
Figure 10:
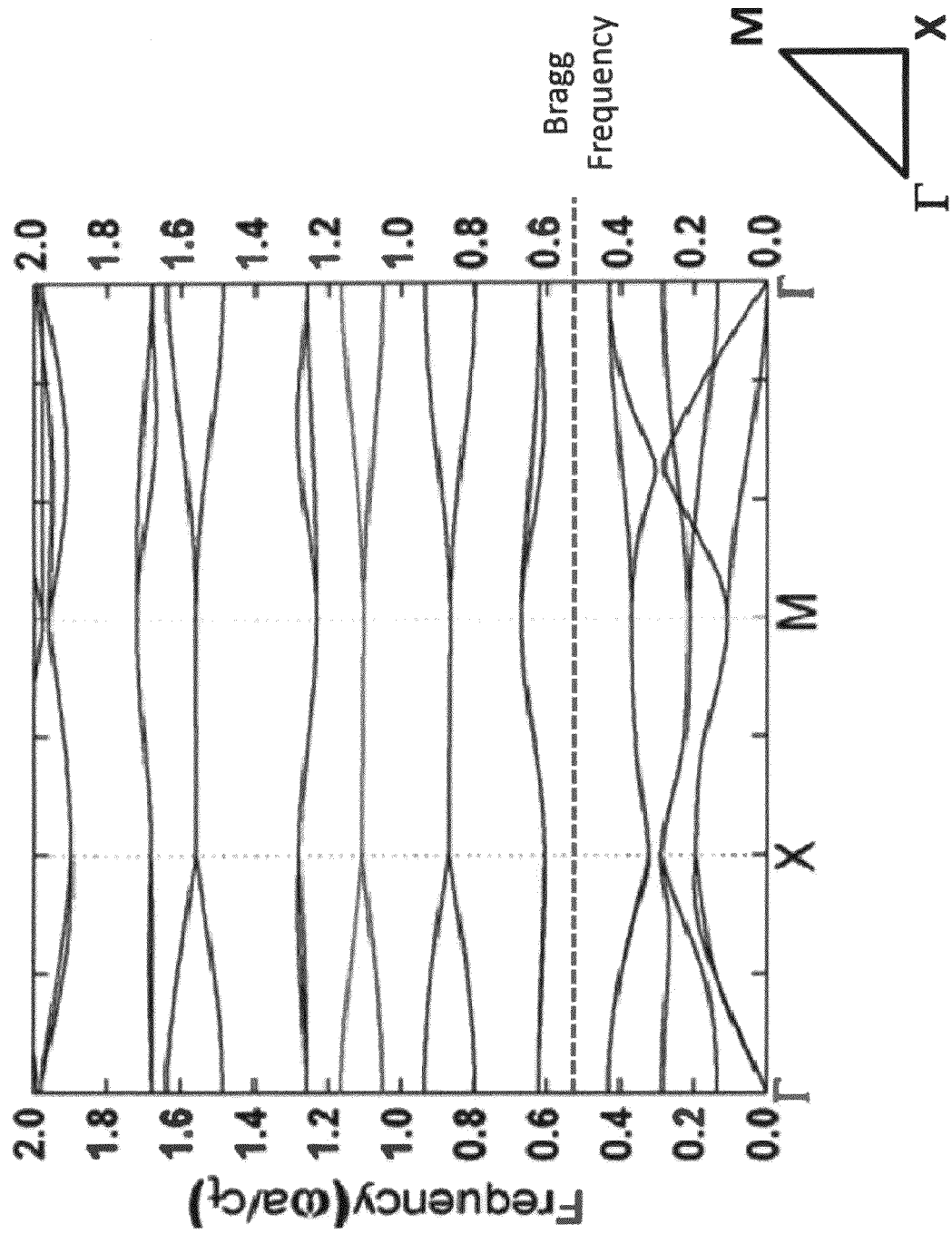
FIG. 10 is a graph describing the band structure dispersion relation for an embodiment of the invention disclosed herein, providing multiple high frequency gaps above the Bragg frequency.
Figure 11:
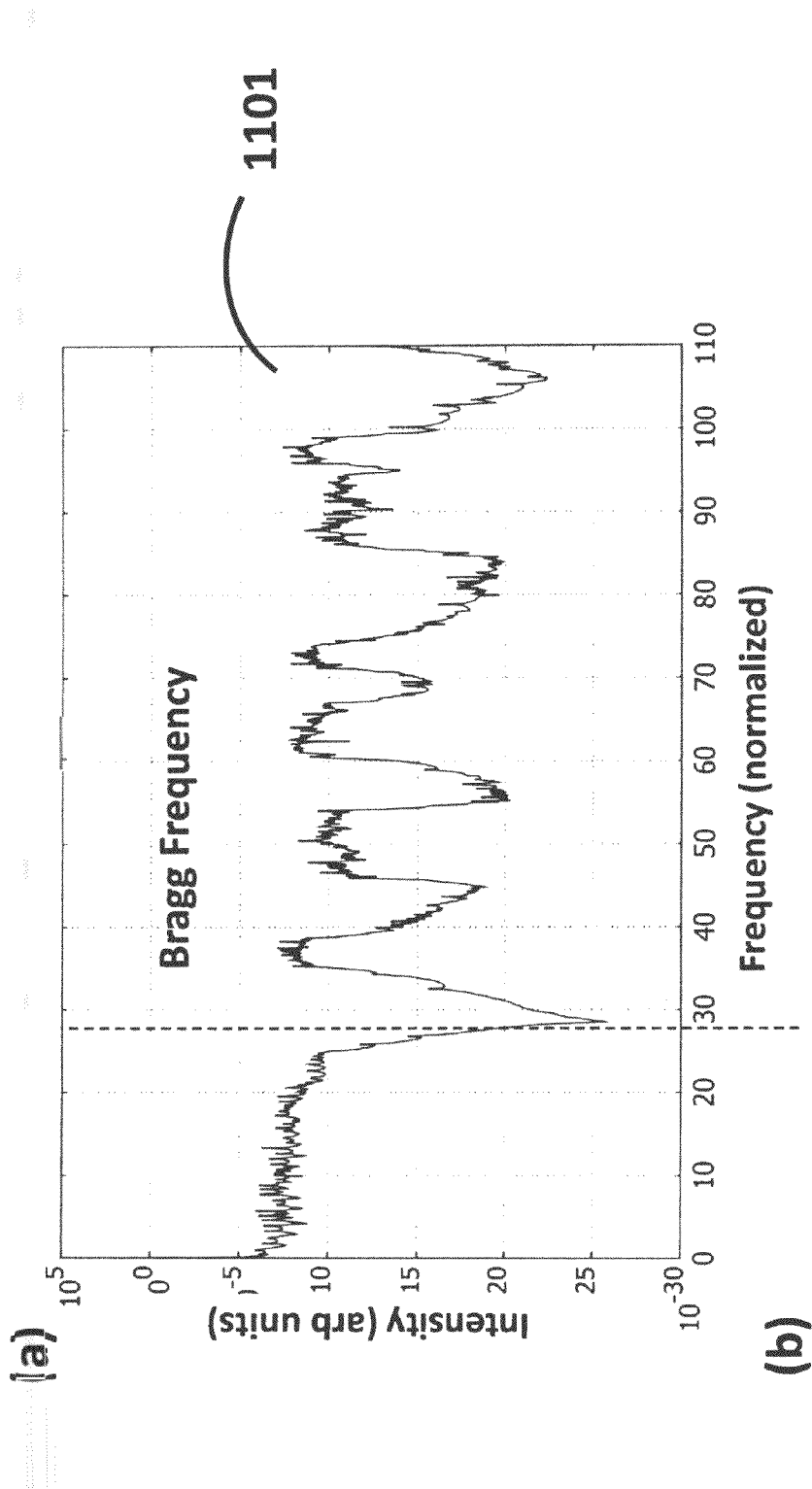
FIG. 11a is a graph of transmission intensity versus frequency of a structure with 10 repeat layers under a longitudinally polarized incident excitation over the normalized frequency range ($\omega$a) of 0 to 100, described by FIG. 11b.
FIG. 11b is a schematic illustration of a metamaterial according to an embodiment of the invention.

Referring still to FIG. 9, based on the prescribed lattice net, there are two possible families of mechanical connections to connect the building blocks while conforming to the chosen lattice net 900. In this chosen embodiment, as the criterion to obtaining the designed dispersion relation exemplified in FIG. 10, one would need to choose mechanical connections that are aligned along the symmetry elements 902 of the individual building blocks; in this particular metamaterial structure, this set of mechanical connections are along the <11> family of directions. This deterministic method of designing the metamaterial structure as demonstrated illustrates the invention as a rational method of designing the band dispersion of a metamaterial. Referring to FIG. 10, the computed band dispersion relation shows multiple high frequency spectral gaps, above the associated Bragg frequency located nominally at $(\omega a/c) \geq 0.5$. This dispersion relation was computed for amorphous silicon, using material parameters of E=156 Gpa, Poisson ratio of 0.2152 and mass density of 2330 kgm-3. FIG. 11 shows the computed transmission spectrum of a 10 layer structure for longitudinal 1101 excitation; as the spectral gaps are complete, the attenuation for the transverse excitation will be similar. A longitudinal source is launched from 1102, propagates through the ten repeat unit metamaterial structure 1103, and the transmission intensity is collected at 1104. To be clear, 1103 represents a single repeat unit along the lateral direction with 10 repeated layers forming the actual metamaterial structure. However, someone ordinarily skilled in the art will realize that this number of repeat layers can be varied in order to achieve the required performance.

One notes that the primary transmission dip at 30 kHz (for a unit cell size, with a=1 mm) corresponds to the Bragg frequency. The multiple high frequency gaps, referring to FIG. 10, present an overall improved attenuation of 50 dB or greater in frequency ranges up to 3 times higher (~120 KHz) than that of the typical Bragg frequency, which in this exemplary embodiment is at 30 KHz. This cascade of multiple high frequency gaps together enable a wide broadband attenuation that replaces the need for a sequence of cascaded structures which may each possess attenuation in a small section of the frequency spectrum, for example. Importantly, the structure 800 in FIG. 8 possesses high frequency attenuation of ~100% bandwidth (~40 to 120 KHz here), while having a structural length scale two times smaller than that typically required for phononic crystals.

The third embodiment describes the design of a metamaterial array with a sub-wavelength gap and double-negative index transmission band, utilizing only a single solid material. This particular embodiment based on the invention enables those ordinarily skilled in the art to realize metamaterial structures with sub-wavelength gaps and a double-negative index transmission band. In current art, the realization of a sub-wavelength metamaterial typically requires the incorporation of multiple material platforms, typically greater than two, with widely varying mechanical properties such as bulk modulus, Young's modulus, mass density, and Poisson ratio [1-6]. In the general case of anisotropic materials utilized in the building blocks, the stiffness and compliance tensor of the constituent materials may be widely different. Hence, the requirements typically involve intrinsic mechanical impedance contrast between the different materials as the fundamental mechanism for the formation of the sub-wavelength gaps and double negative index band and give the impression that the realization of such behavior requires not only a complex design but use of a set of component materials each having special mechanical properties. This invention demonstrates the formation of the subwavelength spectral gap and the double negative index band can be done by utilizing a monolithic, homogeneous, isotropic single material.

Figure 12:
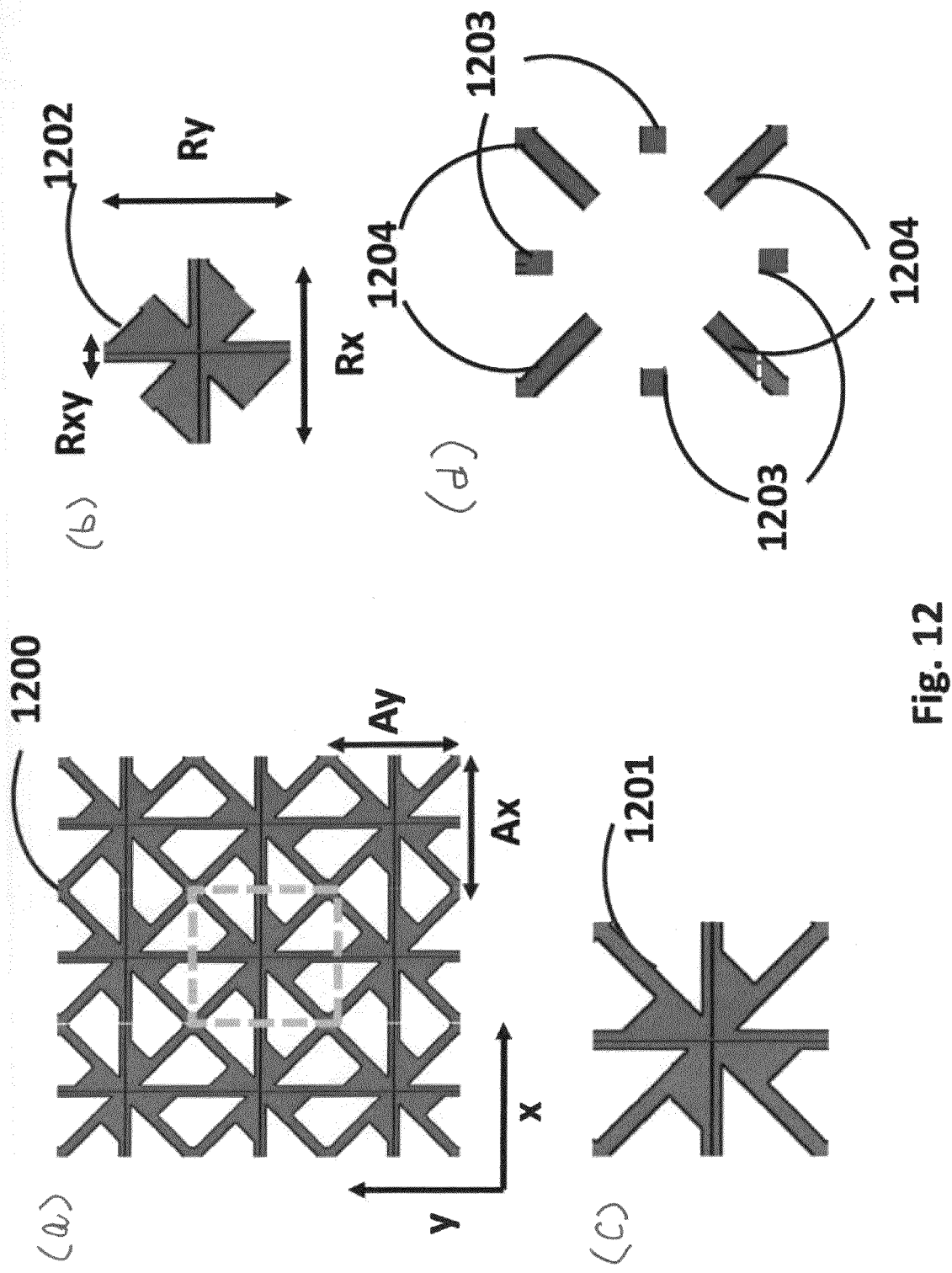
FIGS. 12a, b, c and d are schematic illustrations of the unit cell structure of another embodiment of the invention, that possesses a negative index band (arrowed), providing a schematic of the two dimensional array (12a), the components of each individual building blocks of the unit cell (12b,c) and the schematic of the unit cell (12c)
Figure 13:
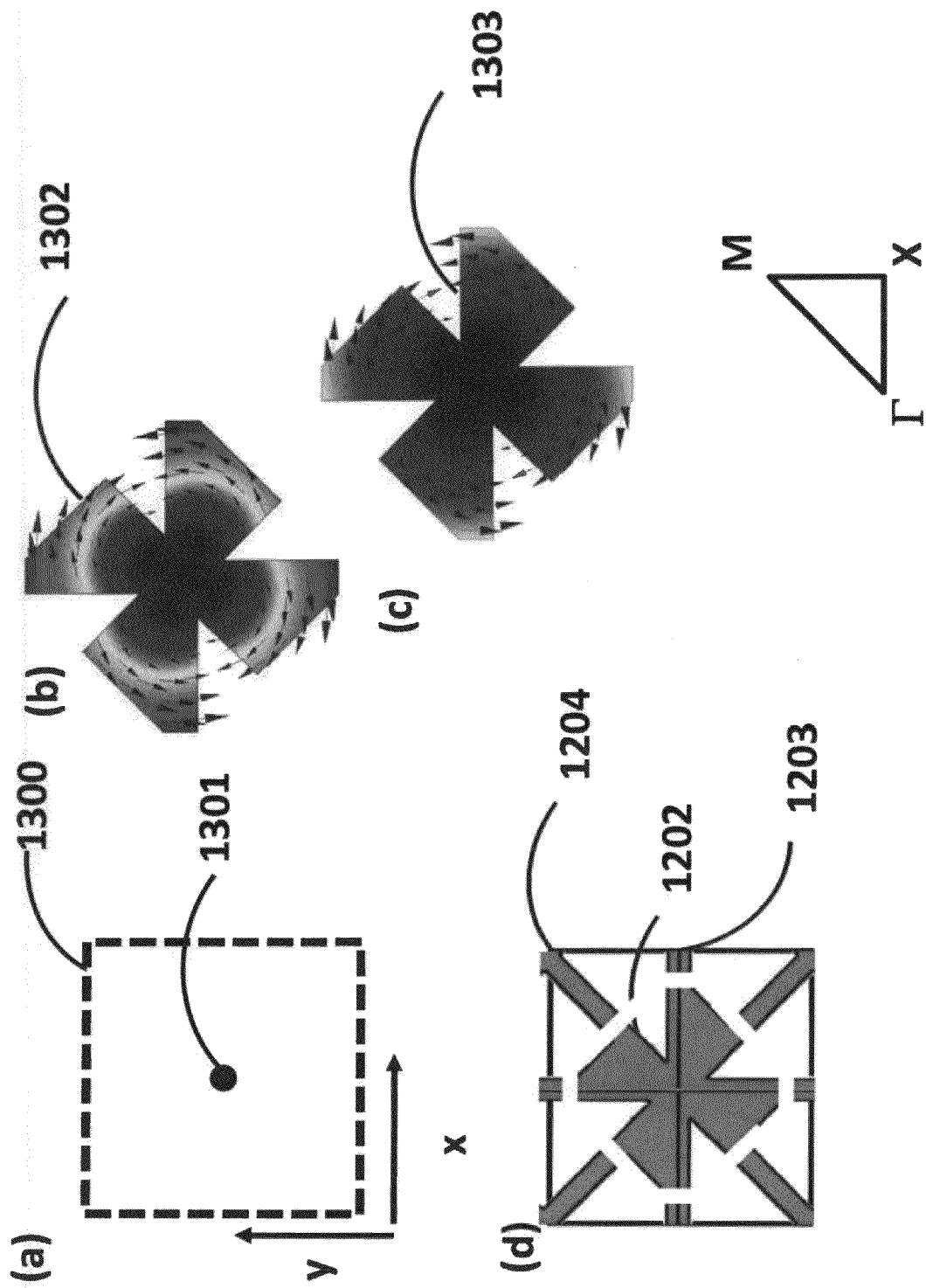
FIGS. 13a, b, c and d are schematic illustrations of representative building block components constituting a unit cell of a metamaterial design of an embodiment of the invention, providing the lattice net with the Wyckoff position, the two constituent eigenmodes (13*b*,*c*) and the formation of the unit cell structure.
Figure 14:
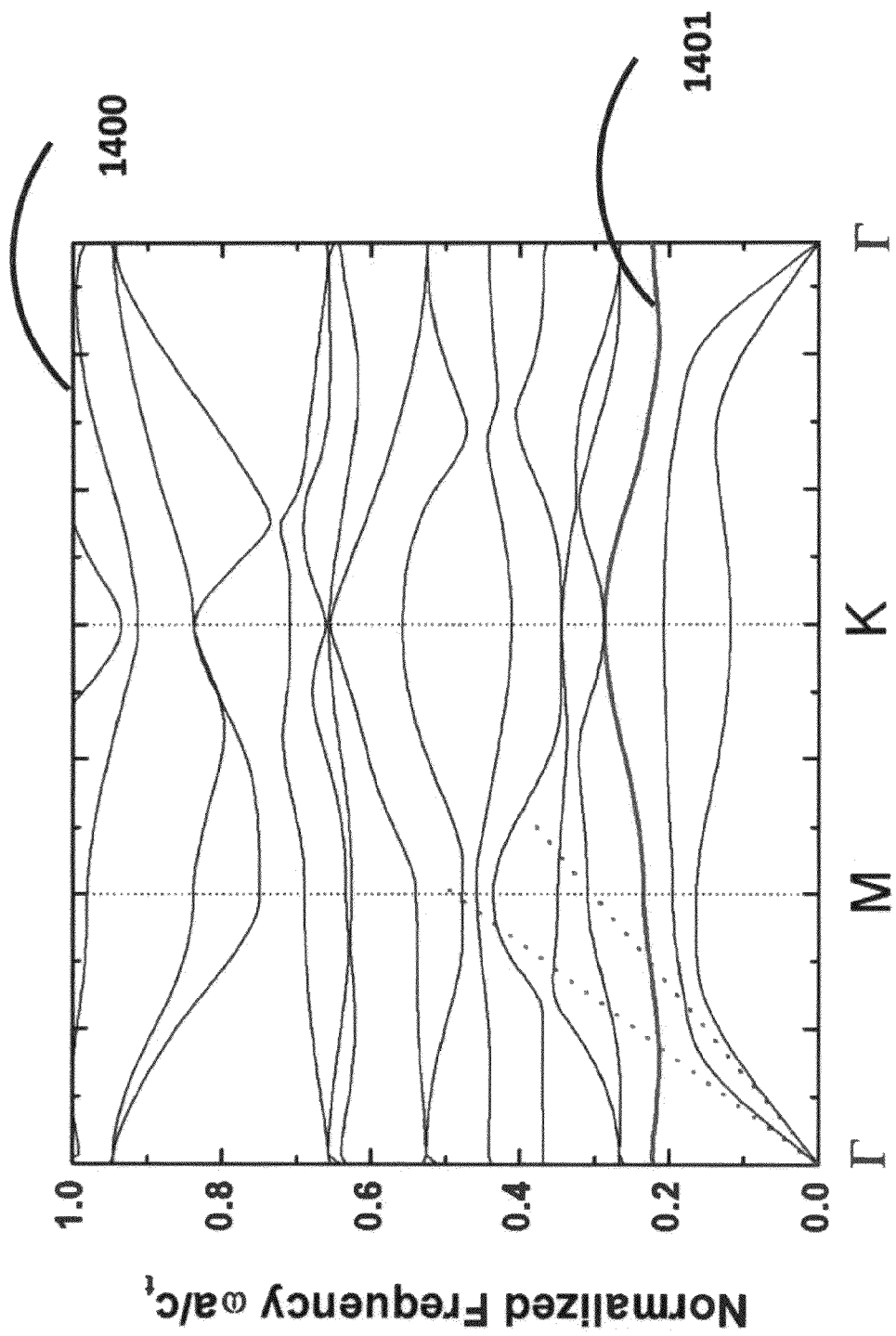
FIG. 14 is a graph showing the band structure dispersion relation of an embodiment of the invention.

Referring to FIG. 12, the unit cell 1201 that is repeated in an array 1200 is demonstrated here. In this particular embodiment, the focus is on creating a subwavelength gap and a double negative index band. The typical requirement for a double negative index band requires building block(s) that have both monopolar and dipolar resonances lying within the desired subwavelength regime, determined by the correct choice of the building block(s), through their geometry, materials choice etc. Usually, more than one type of building block is required, one with the requisite monopolar resonance and the other with the requisite dipolar resonance. Subsequently, by placing the two building blocks with their respective resonances lying in the same frequency range, the two modes hybridize and interact to form a single double negative index band. This double negative band is characterized by both dynamic negative mass density and negative modulus. The particular embodiment here advances this by designing a building block that hybridizes both the monopolar and dipolar resonant modes. The building block 1202 in FIG. 12(*b*) exhibits both monopolar like motion, captured by its symmetric absolute displacement profile, while its dipolar like motion is captured by the details of the displacement vector field, which exhibits an anti-symmetric profile that is typical of dipolar-like motion. The size and orientation of the mechanical connections 1203, 1204 are varied and designed in order to form the eventual double negative band and the sub-wavelength gap. In this embodiment, in order to achieve both resonance modes with a single material, the lattice net 1300 in FIG. 13, is chosen to have low point symmetry. In particular, the choice of Wyckoff position 1301 for the placement of the building block imparts point symmetry of a single 4-fold rotation. This choice of the lattice net enables the hybrid resonant mode 1302 to form the double negative index hand 1401. FIG. 14 provides the computed dispersion relation of the sub-wavelength metamaterial, exhibiting clearly that the band 1401 occurs at a normalized frequency of ~0.22, significantly lower that the typically Bragg frequency, defined as around 0.5. There is also the presence of a narrow sub-wavelength spectral gap of approximately 7% normalized gap width.

Figure 15:
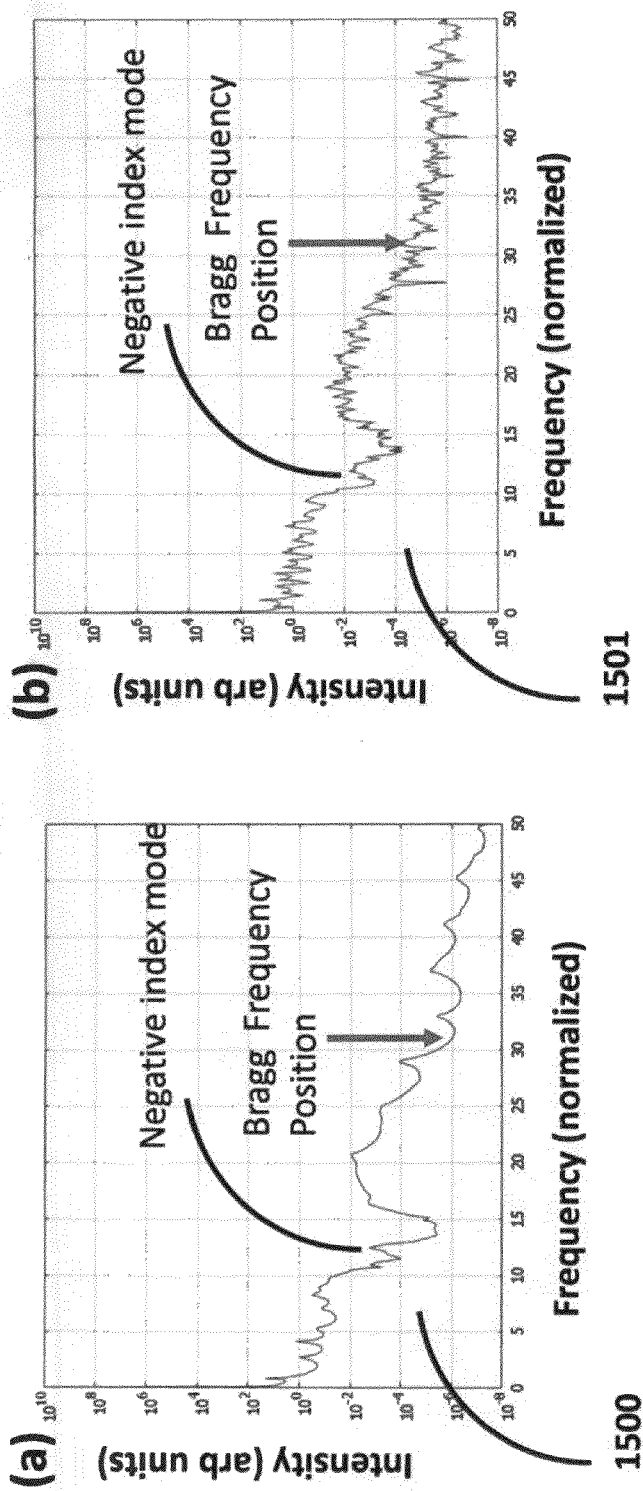
FIGS. 15*a* and *b* are graphs of intensity versus frequency for a longitudinally polarized incident excitation and a transversely polarized incident excitation across a normalized frequency range (ωa) from 0 to 50.
FIG. 15*c* is a schematic illustration of a metamaterial according to an embodiment of the invention.
Figure 15:
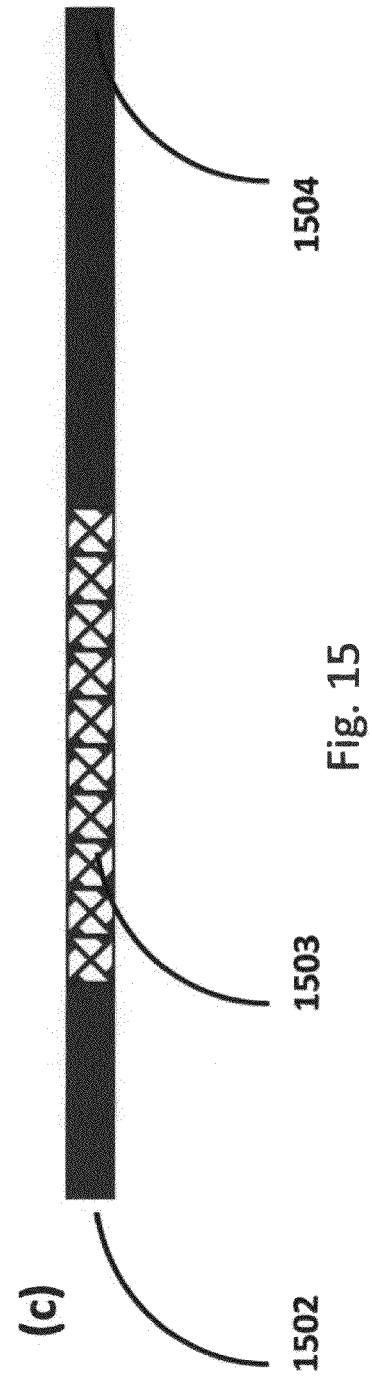

FIG. 15 further describes an embodiment of the metamaterial as a sub-wavelength vibration isolation material 1503, together with its associated transmission spectrum from longitudinal 1500 and transverse 1501 excitations of a 10 layer material; the sub-wavelength gap is clearly present, showing 20 dB-30 dB suppression in transmission in the sub-wavelength spectral region, with reference to the Bragg frequency. Referring to both 1500 and 1501, the excitation is launched from 1502 and collected at 1504, after propagating through the material in 1503. A second exemplary embodiment of the invention is the formation of the negative index band 1401 of the designed metamaterial, functioning as a compact sub-wavelength lens for focusing vector elastic waves, as exemplified by the double negative index band in 1401, and by the indicated transmission peak at the corresponding frequency under longitudinal excitation in 1501 and transverse excitation in 1502, which are indications of the double negative index behavior, because this mode is active under both modes of excitations and its group velocity, defined as $\partial\omega(k)/\partial k$, is negative, as is clear from the negative slope of 1401. This demonstrates the focusing effect of incident transverse and longitudinal waves associated with a double negative index metamaterial.

Those of ordinary skill in the art may recognize that many modifications and variations of the present invention may be implemented without departing from the spirit or scope of the invention.

The contents of all of the references listed herein are incorporated herein by reference in their entirety.

REFERENCES

| Relevant Patents | | |
|---|---|---|
| U.S. Pat. No. 8,054,145 | November 2011 | Mohammadi, et al |
| U.S. Pat. No. 8,094,023 | January 2012 | El-Kady et al |
| U.S. Pat. No. 7,733,198 | Jun. 8, 2010 | Olsson, et al |
| U.S. Pat. No. 7,292,740 | November 2007 | Barker, et al |
| U.S. Pat. No. 8,132,643 | March 2012 | Berker, et al |

Other Publications

1. Z Y Liu, et al, "Locally Resonant Sonic Materials", Science, 289, 1734 (2000)
2. Liu Z Y, Chan C T, Sheng P, "Three-component elastic wave band-gap material", Phys. Rev. B, 55(16), 165116 (2002)
3. Ding Y Q, Liu Z Y, Qiu C Y et al, "Metamaterial with simultaneously negative hulk modulus and mass density", Phys. Rev. Lett, 99(9), 093904 (2007)
4. Sheng P. Chan C T, "Classical wave localization and spectral gap materials", Zeitschrift fur Krystallographie, 220, 9-10, 757 (2005)
5. Lai Y, Wu Y, Sheng P. Zhang Z Q, "Hybrid Elastic Solids", Nat. Mat, 10, 620 (2011)
6. Bilal O R, Hussein M I, "Ultrawide phononic band gap for combined in-plane and out-of-plane waves, Phys. Rev. E, 84, 065701R (2011)
7. Economou, E. N.; Zdetsis, A. 'Classical wave propagation in periodic structures', Phys. Rev. B 40, 1334 (1989)

8. Sigalas, M.; Kushwaha, M. S.; Economou, E. N. et al, 'Classical vibrational modes in phononic lattices: theory and experiment', Z. Kristallogr. 220, 765 (2005)
9. Pennec Y, Vasseur J O, Djafari-Rouhani B, Dobrzynski L, Deymier P A, "Two-dimensional phononic crystals: Examples and applications", Surface Science Reports, 65(8), 229 (2010) and references therein
10. International Tables of Crystallography, Springer 2002
11. Cracknell A P, "Tables of the Irreducible representations of the 17 Two-Dimensional Space groups and their relevance to quantum mechanical eigenstates for surfaces and thin films", Thin Solid Films, 21(107), (1974)
12. Lax M J, *Symmetry Principles in Solid State and Molecular Physics*, John Wiley & Sons (1974)
13. Sternberg S, *Group Theory and Physics*, Cambridge University Press (1995)

What is claimed is:

1. Phononic metamaterial device including an array comprising a periodic array of repeated unit cells forming a lattice, with the design of the unit cell determined by a lattice net, wherein the size and geometric shape of a building blocks, the orientation and size of mechanical connections that for the mechanical topology of the lattice are selected to provide specific dispersion relations for elastic and acoustic wave propagation in the phononic metamaterials.

2. The device of claim 1, wherein this metamaterial array comprise a sub-component or as part of a vibration isolation platform, a focusing lens, or a filter.

3. The device of claim 1, wherein the array is an unsupported monolithic slab of material which can be either silicon or other semiconductor, a metal, a ceramic, a polymer, or a composite as well as gels and fluids and suspensions/emulsions and comprises a lattice array of unit cell building blocks consisting of solid blocks or liquid objects connected by mechanical connections.

4. The device of claim 3, where the mechanical connections may consist of the same or different material compared with that utilized for the building block.

5. The device of claim 3, where different building blocks in a chosen lattice net, should the lattice net possess multiple Wyckoff sites per unit cell, may consist of the same or different material.

6. The device of claim 3, where the mechanical connections may consist of different materials in order to optimize damping of mechanical or acoustical energy, or performance of the intended function of the device.

7. The device of claim 3, where the different building blocks may consist of different materials in order to optimize damping of mechanical or acoustical energy, or performance of the intended function of the device.

* * * * *